March 22, 1966  J. N. COOPER ETAL  3,242,471
METHOD OF OPERATING SUPERCONDUCTIVE APPARATUS
Filed Sept. 29, 1959  2 Sheets-Sheet 1
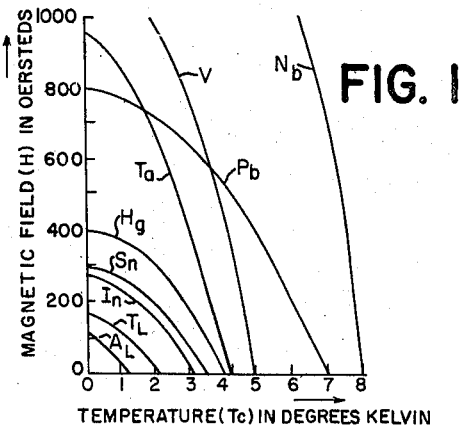
FIG. 1
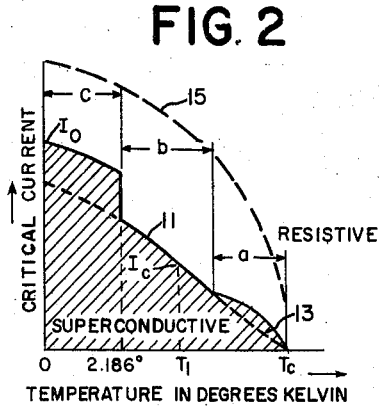
FIG. 2
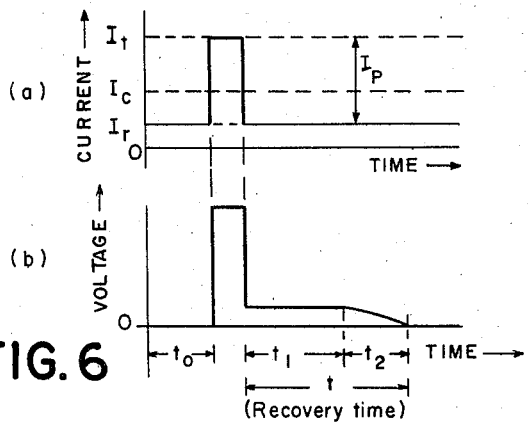
FIG. 6
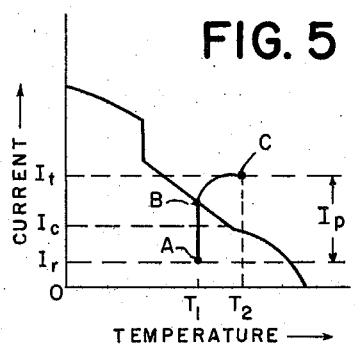
FIG. 5
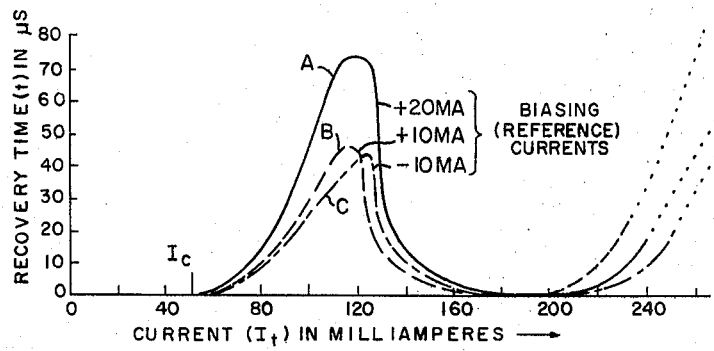
FIG. 7
FIG. 3
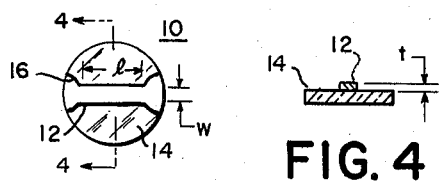
FIG. 4
JOHN N. COOPER
EUGENE C. CRITTENDEN, JR.
ARTHUR J. LEARN
FRED W. SCHMIDLIN
INVENTORS
Jerry A. Durardo
AGENT
Albert Rosen
BY March 22, 1966  J. N. COOPER ETAL  3,242,471
METHOD OF OPERATING SUPERCONDUCTIVE APPARATUS
Filed Sept. 29, 1959  2 Sheets-Sheet 2

JOHN N. COOPER
EUGENE C. CRITTENDEN, JR.
ARTHUR J. LEARN
FRED W. SCHMIDLIN
INVENTORS

Jerry A. Dinardo
AGENT

Albert Rosen

BY

ATTORNEY

United States Patent Office 3,242,471
Patented Mar. 22, 1966

3,242,471
METHOD OF OPERATING SUPERCONDUCTIVE APPARATUS
John N. Cooper, Carmel, Eugene C. Crittenden, Jr., Monterey, and Arthur J. Learn and Fred W. Schmidlin, Inglewood, Calif., assignors, by mesne assignments, to Thompson Ramo Wooldridge Inc., Cleveland, Ohio, a corporation of Ohio
Filed Sept. 29, 1959, Ser. No. 843,174
3 Claims. (Cl. 340—173.1)

This invention relates to the art of superconductivity, and more particularly to an improved method of operating superconductive computer elements of the thin film variety.

In the investigation of the electrical properties of materials at very low temperatures it has been found that the electrical resistance of many materials drops abruptly as the temperature is lowered to that close to absolute zero (0° Kelvin)—the material in such a state being termed superconductive. That the electrical resistance of a material in a superconductive state is actually zero, or so close to it as to be undetectable by measurement, has been well illustrated by experiments at the Massachusetts Institute of Technology where a relatively large current, induced in a lead ring, immersed in liquid helium, continued to flow without any detectable decay for a period of over two years.

In data processing and digital computing systems there is a need for small, high speed electrical components such as switches. In such systems digital information is frequently represented by an electrical current which may be passed through a myriad of electrical circuits to perform computations and manipulations of a complexity and magnitude that would be impractical by any manual means. While superconductive digital data handling arrangements have been proposed, the switching speeds of such arrangements have not heretofore been great enough to warrant the widespread use of such arrangements in place of the more conventional data handling arrangements now in use.

Accordingly, one of the objects of this invention is to increase the operating speed of superconductive computer arrangements.

Another object of the invention is the provision of an improved method of operating a superconductive switch element that permits the attainment of increased switching speeds.

It is known that a superconductive element can be caused to switch from a superconductive to a resistive state by subjecting the element to an electrical current of a value in excess of a given critical value, this critical value being referred to as the critical current. After the switching current ceases to flow through the element, it reverts to its superconductive state.

In the operation of a superconductive element as a switching device, there are two considerations that govern the switching speed of the element: the time required for the switching of an element from its superconductive to its resistive state, and the time required (after cessation of the useful portion of the switching operation) for the element to return from the resistive state to a useable superconductive state. The superconductive-to-resistive time will be referred to herein as the lag time. The resistive-to-superconductive time will be referred to herein as the recovery time. This invention is primarily concerned with increasing the switching speed of a superconductive element by minimizing the recovery time.

Considered from one aspect, this invention is based on the discovery that the recovery time of a superconductive switching element, that is switched by a current pulse, is a critical function of the amplitude of the pulse and of the time duration or width of the pulse. In general, as the amplitude of the pulse is increased beyond the critical current value, it has been found that the recovery time increases to a first maximum, then decreases to a minimum, and then increases again. A similar recovery time response results from varying the duration or width of a short time duration pulse (that is, a pulse having a duration of less than about 10 microseconds) while keeping the amplitude constant. Thus, for short time duration pulses the recovery time is dependent upon both the amplitude and the duration or width of the pulse, while for long time duration pulses (e.g., longer than about 10 microseconds) the recovery time is dependent upon pulse amplitude and is substantially independent of pulse width. From the foregoing it can be seen that the recovery time response of a superconductive element can be considered to be a function of the electric charge passing through the element, inasmuch as the amount of charge present in a current pulse is equal to the product of the current amplitude and the time duration of the current pulse. It is understood, however, that the recovery time response of an element that results from varying the charge flowing through the element by varying the amplitude of an applied current pulse may be different from the response that results from varying the time duration of a constant amplitude pulse.

In accordance with the invention, it is contemplated to operate a superconductive element so that the recovery time is close to the minimum. The quantity of electric charge applied to the element during its operation is selected to be greater than the value of charge that results in a first maximum recovery time, and yet unappreciably greater than the value for which the recovery time is a minimum. Thus, where it is contemplated to apply a current pulse to a superconductive switch element, the method of the invention specifies that the amplitude of the pulse be limited to a range of values which will result in a substantially minimum recovery time. Further, where it is contemplated to apply a short time duration current pulse of given amplitude, it is specified that the duration of the pulse be limited to a range of values which will result in a substantially minimum recovery time.

In the drawings, wherein like reference characters refer to like parts or phenomena:

FIG. 1 is a graph illustrating the variation in transition temperatures for various materials as a function of the magnetic field to which they are subjected;

FIG. 2 is a graph of the transition temperature of indium as a function of electric current passed through the material;

FIG. 3 is a plan view of a representative thin film superconductive device useful in practicing the invention;

FIG. 4 is a sectional view taken along line 4—4 of FIG. 3;

FIG. 5 is a graph similar to that of FIG. 2 and illustrates the temperature effect of passing a switching current through a superconductive element;

FIG. 6 is a graph of waveforms useful in explaining the operation of the invention;

FIG. 7 is a graph illustrating the variations in recovery time of a superconductive element as a function of the amplitude of a relatively long time duration switching pulse;

Superconductive phenomena

Figure 8:
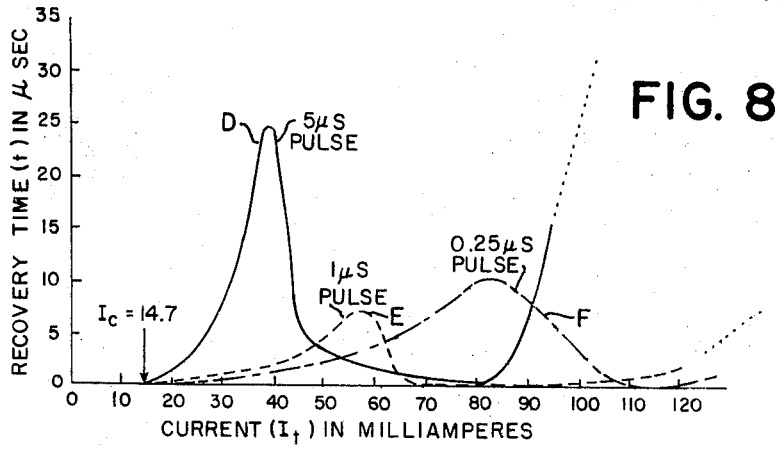
FIG. 8 is a graph illustrating the variations in recovery time of a superconductive element as a function of the amplitude of a relatively short time duration switching pulse.

Since the method of the invention is predicated upon certain effects peculiar to the phenomena of superconductivity, these effects will be discussed prior to a discussion of embodiments of the invention.

At temperatures near absolute zero some materials apparently lose all resistance to the flow of electrical current and become what appear to be perfect conductors of electricity. This phenomenon is termed superconductivity and the temperature at which the change occurs, from a normally resistive state to the superconductive state, is called the transition temperature. For example, the following materials have transition temperatures, and become superconductive, as noted:

|  | Degrees, Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

Only a few of the materials exhibiting the phenomenon of superconductivity are listed above. Other elements, and many alloys and compounds, become superconductive at temperatures ranging between 0° and around 20° Kelvin. A discussion of many such materials may be found in a book entitled "Superconductivity" by D. Schoenberg, Cambridge University Press, Cambridge, England, 1952.

The above-listed transition temperatures apply only where the materials are in a substantial zero magnetic field. In the presence of a magnetic field the transition temperature is decreased. Consequently, in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled "Magnetically Controlled Gating Element," granted to Dudley A. Buck.

In addition, the above-listed transition temperatures apply only in the absence of electrical current flow through the material. When a current flows through a material, the transition temperature of the material is decreased. In such a case the material is in an electrically resistive state even though the temperature of the material is lower than the normal transition temperature. The action of a current in lowering the temperature at which the transition occurs (from a state of normal electrical resistivity to one of superconductivity) is similar to the lowering of the transition temperature by a magnetic field.

Accordingly, when a material is held at a temperature below its normal transition temperature for a zero magnetic field, and is thus in a superconductive state, the superconductive condition of the material may be extinguished by the application of an external magnetic field or by passing an electric current through the material.

FIG. 1 illustrates the variation in transition temperatures ($T_c$) for several materials as a function of an applied magnetic field. In the absence of a magnetic field, the point at which each of the several curves intercepts the abscissa is the transition temperature at which the material becomes superconductive. (The transition temperature for each material varies almost parabolically with the magnetic field applied to it, as expressed by the function $$\frac{H_c}{H_o} = 1 - \left(\frac{T}{T_c}\right)^2$$

where $H_c$ is the critical magnetic field density for effecting a transition from the superconductive to the resistive state at any given temperature T, $H_o$ is the intercept of a curve on the ordinate axis, at zero degrees Kelvin, and $T_c$ is the transition temperature of the material.)

The transition temperature is given in degrees Kelvin. The particular material is superconductive for values of temperature and magnetic field falling beneath each of the several curves, while for values of temperature and magnetic field falling above a curve, the material possesses electrical resistance.

Since a current flowing in the material has an effect upon the transition temperature that is similar to the effect of a magnetic field, the passage of a current through superconductive materials will yield curves similar to those shown in FIG. 1. It has been found that if the material is in the bulk form of a cylindrical wire, the transition curve relating critical direct electric current and transition temperature is relatively smooth. However, if the superconductive element takes the form of a relatively thin film, the shape of the curve relating critical current and transition temperature is somewhat different. The thin film relationship curve is illustrated in FIG. 2 by a solid line 11. This line 11 illustrates the effect of a varying steady direct electric current through a thin film superconductive element made of indium, and immersed in a liquid helium bath. At any given temperature $T_1$, for example, the element becomes resistive as current is increased above a critical direct current value $I_c$.

In FIG. 2, three different temperature regions have been observed in connection with the phenomena depicted by line 11. In the first region a, a temperature region immediately below the critical temperature $T_c$ (which is about 3.4 degrees Kelvin for indium in thin film form), complete transition of the film from the superconductive to the resistive state is preceded by localized transitions within the film. These localized transitions, which are thought to be due to mechanical imperfections in the film, occur at current densities or levels somewhat lower than the levels associated with the solid line 11 critical current curve. These somewhat lower transition current levels are illustrated by the dashed line 13. In the second temperature region b, any localized transition is followed by a complete transition of the entire film at the same current level.

In the third region c, the region below 2.186 degrees Kelvin (the lambda point of helium), localized transitions of the film to the resistive state occur at current densities slightly lower than the current densities required for complete transition of the entire film. The lower current level required for the initiation of localized transition in this third region c is indicated in FIG. 2 by the dashed line 13. The explanation for the phenomenon experienced in the third region c operation appears to be based upon the fact that at a temperature at and below the lambda point temperature, liquid helium becomes an almost perfect heat conductor. The switching speed of a superconductive element operated at a temperature below the lambda point is observed to be substantially higher than the switching speed of the superconductive element operated at a temperature above the lambda point.

Operation in the third region c of the solid line curve 11 of FIG. 2 follows approximately the function $$\frac{I_c}{I_o} = 1 - \left(\frac{T}{T_c}\right)^4$$

where $I_c$ is the critical current level for effecting a transition from the superconductive to the resistive state at any given temperature T, $I_o$ is the intercept of the curve 11 on the ordinate axis (at zero degrees Kelvin), and $T_c$ is the transition temperature of the particular superconductive material used.

The switching of a superconductive element by the application of a steady state direct electric current of magnitude just sufficient to cause the superconductive-to-resistive transition is believed to be initiated by the localized switching of one or more regions of the element, perhaps in the vicinity of a physical imperfection. Once the localized region switches, resistive heating of the switched region by the continued passage of current is believed to cause the boundaries of the region to move and enlarge to other regions until the entire element becomes resistive. The motion of boundaries is believed to be primarily responsible for the time delay or lag in switching from the superconductive to the resistive state. For temperatures above the lambda point, the time delay is about 100 microseconds per millimeter of element length. For temperatures below the lambda point, the time delay is about 1 microsecond per millimeter of length.

If a pulse of current of magnitude greater than the minimum steady direct current required for switching is applied to a superconductive element, the speed of propagation of the boundaries is dependent on the pulse amplitude. The velocity of the boundaries increases with increased pulse amplitude until an amplitude is reached such that the switching takes place without apparent boundary motion. Although switching is not instantaneous with the application of a pulse, the switching does occur within a much shorter time as compared to direct current switching. Moreover, as the amplitude of the pulse is further increased, the lag time decreases. For this type of pulse switching, the curve relating critical current pulse amplitude and temperature is a smooth one, as shown in the broken line curve 15 of FIG. 2. This curve 15 follows approximately a fourth power function similar to that described above in connection with the operation of the third region $c$ of the solid line curve 11. The irregularities in the transition curve that are characteristic of steady direct current switching (curve 11) are not present in the transition curve resulting from pulse switching (curve 15), probably because thermal effects contribute far less to the transition process in pulse switching and, in pulse switching, transition in state occurs primarily through internally generated magnetic fields attendant the flow of pulse current through the superconductive element.

FIGS. 3 and 4 illustrate a representative thin film superconductive device 10. The device 10 comprises a superconductive element 12 in the form of a vacuum deposited, metallic film of generally rectangular shape, mounted on a glass substrate 14. The element 12 is provided with widened ears 16 at its ends to serve as terminals for connection to a voltage source (not shown). Such an element 12 may typically have a width dimension $w$ of 60 microns, a thickness dimension $t$ of 0.1 micron, and a length $l$ of 7 millimeters.

Method of minimizing superconductive element recovery time

In the operation of a thin-film superconductive switching element there exists a recovery time period during which the element is insensitive to new input signals. It has been found that this recovery time is long for low current level signals, is short for intermediate current level signals, and is then long again for still larger current level signals. The method of the invention involves the use of those intermediate signal levels. This invention is predicated upon the discovery that the recovery time of a superconductive switch element is critically dependent upon the amplitude and upon the duration or width of the switching current pulse applied to the element.

Reference is made to FIG. 5 for a better understanding as to the manner in which the recovery time of a superconductive element may be measured. This figure shows the characteristic curve for critical current as a function of temperature for a thin-film superconductive element, say the element 16 of FIGS. 3 and 4. The switching and recovery action of the element will be explained in connection with the application of a switching pulse of sufficiently long time duration to establish temperature equilibrium in the element.

At a given temperature $T_1$, in FIG. 5, the element will have associated with it a critical current $I_c$ at the intersection B of the curve with the vertical constant temperature line corresponding to temperature $T_1$. If a steady biasing or reference current of value $I_r$ (which is at a current level that is less than the critical current $I_c$) is passed through the element, the element can be represented as being at a point A where the horizontal line representing the steady current $I_r$ intersects the vertical line representing the temperature $T_1$. If there is now applied to the element a current pulse of amplitude $I_p$, sufficient to raise the total current $I_t$ (where $I_t = I_r + I_p$) above the critical current value $I_c$, the element will undergo a transition from its superconductive state (at point A) to a resistive state (at point B) when the current reaches the critical current level $I_c$. As the current exceeds the critical current level $I_c$, the current will cause heating of the element so that the element drifts to a higher temperature $T_2$ at a point C corresponding to the total current $I_t$. It is assumed that the width of the applied current pulse is long enough to establish temperature equilibrium in the element at the higher temperature $T_2$. When the applied pulse is terminated the element reverts to its superconductive state at point A. However, it takes a finite length of time for the element to return to its superconductive state, this finite time being the recovery time.

The relationship of the current applied to the element with the voltage across it, as a function of time, is shown in FIGS. 6a and 6b, respectively. It is seen that during the time $t_0$ prior to the application of the current pulse (FIG. 6a) the biasing or reference current $I_r$ is insufficient to cause a state transition in the superconductive element. Accordingly, the voltage drop across the element is zero, as shown in FIG. 6b. At the end of this time $t_0$ a current pulse of magnitude $I_p$ is applied to the element, whereupon it becomes resistive. At the same time the voltage across the element increases to a value dependent upon the amplitude of the total current $I_t$ and the resistance of the element. When the applied pulse is terminated the current falls to the biasing or reference current level $I_r$, and the voltage across the element drops to a level determined by the reference current $I_r$ and the resistance of the element. However, the voltage does not immediately drop to zero because it takes a finite time for the resistance of the element to become zero.

As has been shown by repeated measurements, the recovery time $t$ is made up of two time periods, as illustrated in FIG. 6b. One period $t_1$ is the time during which the element is fully resistive, as indicated by a constant voltage drop across the element. The other time period $t_2$ is the time during which the element has a measurable but decreasing resistance, as indicated by a decreasing voltage drop across the element. It is believed that the first period $t_1$ is the time required for the element to reach the phase boundary between superconductive and resistive states. The second period $t_2$ is believed to be the time required for the element to pass through the intermediate state in which the film may be considered to be made up of superconductive domains interspersed with resistive domains.

One might expect that upon increasing the amplitude or the duration (width) of the pulse applied to the superconductive element, the temperature of the element would drift to higher temperatures because of increased resistive heating, and that therefore it would take a longer time for the element to recover to its original superconductive temperature. However, it has been found that the recovery time response of a superconductive element is contrary to expectations. If a long time duration current pulse is applied to an element, and the amplitude of the pulse is progressively increased, it turns out that the recovery time increases rapidly at first for low values of current amplitude, and then reaches a maximum. For higher current amplitudes, the recovery time decreases to a substantially lower value than the maximum, and finally reaches a minimum. For still higher current amplitudes, the recovery time increases again to values beyond the first maximum.

The occurrence of a minimum in the recovery time response of a superconductive thin-film element with increasing pulse amplitude and pulse width, as above described, has been observed only in instances where the element under investigation has been maintained at a temperature above the lambda point of helium (2.186° K.). Although the effect is not yet completely understood it is believed that above the lambda point, the heat generated by the increased current passed through the element gives rise to the formation of minute bubbles of vaporization of the liquid helium, which in turn promote cooling of the superconductive element. At temperatures below the lambda point, however, any heat developed in the superconductive element is quickly conducted away by the liquid helium, due to its extremely high heat conductivity, so that vapor bubbles can not readily form.

FIG. 7 is a set of graphs which show typical variations in recovery time of a thin-film superconductive element as the applied pulse amplitude is increased. Values of recovery time are plotted as a function of total current (the total current being the sum of the applied pulse current and reference current). The curves are plotted from data taken of an indium element deposited on a glass substrate, the element having a width of 60 microns, a thickness of 0.5 micron, and a length of 6.4 millimeters, and maintained at a temperature of 3.04 degrees Kelvin. In the examples of FIG. 7, the pulse width is maintained constant at 20 microseconds. The pulse width in this case is sufficiently long to make the recovery time substantially independent of the applied pulse duration or width, presumably because the element attains a state of temperature equilibrium for pulse widths of greater than about 10 microseconds. In the first curve A of FIG. 7 a reference current of +20 milliamperes is used, the positive sign indicating that the polarity of the reference current is the same as that of the applied pulse. It is seen that as the amplitude of the current pulse is increased so that the total current increases beyond the critical current value of approximately 50 milliamperes, the recovery time increases rapidly to a maximum value of above 70 microseconds at a current amplitude of 120 milliamperes. As the current is increased beyond 120 milliamperes, the recovery time decreases rapidly at first and then more slowly until a minimum value of less than 1 microsecond is reached at a current amplitude of about 220 milliamperes. As the current is increased beyond 220 milliamperes, the recovery time increases indefinitely.

In the second and third curves, B and C respectively, the reference currents used were +10 milliamperes and −10 milliamperes. The negative sign for the latter reference current indicates that the reference current was opposite in polarity to that of the pulse current. It is seen in curves B and C that the maximum and minimum recovery times occur in the same regions of current amplitudes as in curve A. This shows that the recovery time here is substantially independent of the reference current, and depends solely upon the pulse current amplitude. Also it is noted that there is rather a wide range of current values (170 to 220 milliamperes in curve A) for which the recovery time is close to the minimum.

For short pulses, less than about 10 microseconds in duration, the recovery time has been observed to depend not only upon pulse amplitude but also upon pulse width. FIG. 8 shows variations in superconductive element recovery time as a function of different applied pulse amplitudes, different representative short pulses being used. In this instance, the element was made of tin 60 microns in width, 0.2 micron in thickness, and 6.4 millimeters in length; the temperature was 3.69 degrees Kelvin. In curve D the pulse width was 5 microseconds and the reference current was +5 milliamperes. In curve E the pulse width was 1 microsecond and the reference current was +5 milliamperes. In curve F the pulse width was .25 microsecond and the reference current was +10 milliamperes. It is noted that in curves D, E, and F the maximum recovery times were approximately 25, 7.5, and 10 microseconds respectively, while the minimum recovery times were .25 microsecond or less. Also, it is noted that here again there is a wide range of current values (70 to 110 milliamperes in curve E) for which the recovery time is close to the minimum. This can be of advantage in providing a wide freedom in the choice of pulse amplitude which will yield a low lag time as well as a low recovery time. While the recovery time is also rather low for current values slightly in excess of the critical current $I_c$, such low values of current are not useable in applications requiring switching currents substantially in excess of the critical current to provide a short lag time.

Figure 9:
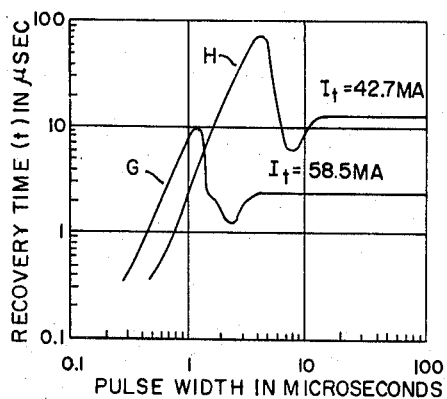
FIG. 9 is a graph illustrating the variation in recovery time of a superconductive element as a function of the width of a relatively short time duration switching pulse.

FIG. 9 shows, in a logarithmic scale, typical variations in recovery time as a function of pulse width, of a thin-film superconductive element. The data for the curves was taken on the same element described above in connection with FIG. 8, with the same temperature of 3.69 degrees Kelvin being maintained. The recovery time was measured for two values of total current, namely 58.5 milliamperes and 42.7 milliamperes. In both instances the reference current was maintained at +5 milliamperes. In the first curve G, it is seen that as the pulse width is increased from .4 microsecond, the recovery time increases rapidly from a value of about .3 microsecond to a maximum of about 10 microseconds, the maximum time occurring for pulse width of between about 1 and 2 microseconds. After reaching the maximum, the recovery time decreases rapidly to a minimum value of slightly above 1 microsecond at a pulse width of about 3 microseconds. For values of pulse width greater than 3 microseconds the recovery time increases again until a steady value of between 2 and 3 microseconds is reached. Curve H shows a similar response, with the recovery time reaching a maximum of about 80 microseconds at a pulse width of approximately 6 microseconds, then decreasing rapidly to a minimum of about 8 microseconds at a pulse width of about 9 microseconds, and then increasing again to a steady value of over 10 microseconds.

Figure 10:
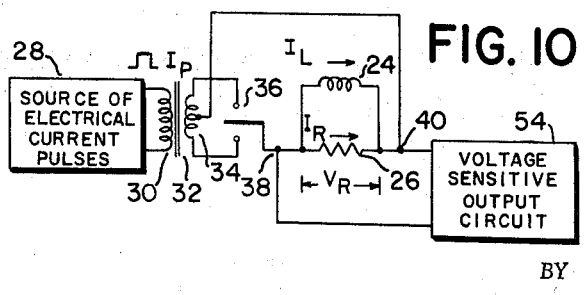
FIG. 10 is a schematic diagram of one form of superconductive computer circuit in which the invention is advantageously used.

One example of a computer circuit, in which the recovery time characteristics of superconductive thin film elements can be advantageously used to optimize the speed of response of the circuit, is shown in FIG. 10. The circuit of FIG. 10 includes a first conductor in the form of an inductance 24 which is constructed of a superconductive material having a given transition temperature $T_c$ at which the material becomes superconductive. A second conductor in the form of a resistance element 26 is connected in a circuit loop with the inductance 24. The resistance element 26 is constructed of a superconductive material having a critical current value $I_c$, at which the material switches from a superconductive state to a resistive state that is lower than the critical current value at which the inductance 24 switches from a superconductive state to a resistive state. The resistance element 26 and inductance 24 may be constructed in any appropriate manner to endow them with the requisite resistance and inductance characteristics. For example, the resistance element 26 may take the form of a rectangular thin film element of the kind shown in FIGS. 2 and 3. The inductance 24 may be a thin film element wound in the form of a spiral or a helix on an insulating support.

In operation, the electrical circuit of FIG. 10 is held at a temperature below the transition temperatures for a zero critical current of both the resistance element 26 and the inductance 24. Since the material for the resistance element 26 is selected to have a critical current value $I_c$ lower than the critical current value of the material of the inductance 24, the entire circuit loop is superconductive for current flow less than the critical current of the resistance element 26. Accordingly, no electrical resistance is presented to current flow and once a current is established, the current flows indefinitely. Thus, a persistent circulating current may be established in the circuit loop which will continue as long as the inductance 24 and the resistance element 26 remain superconducting. However, since the resistance element 26 has a critical current value lower than that of the inductance 24, the resistance element 26 is subject to being made electrically resistive by a current flowing around the loop without affecting the superconducting state of the inductance 24, when the value of the current is in excess of the critical current value of the resistance element 26 and is lower than the critical current value of the inductance 24.

In the arrangement of FIG. 10 a current pulse $I_p$ for initiating a persistent circulating current is derived from a source of electrical current pulses 28. The output circuit of the source of electrical current pulses 28 is connected to a primary winding 30 of a transformer 32. A secondary winding 34 of the transformer 32 is center tapped, and a single-pole double-throw switch 36 is connected across the secondary winding 34 so that either positive or negative current pulses may be derived from the source of electrical current pulses 28. The pulses appearing between the movable element of the single-pole double-throw switch 36 and the center tap of the secondary winding 34 are applied to the circuit loop of the inductance 24 and the resistance element 26 through a pair of terminals 38 and 40.

Figure 11:
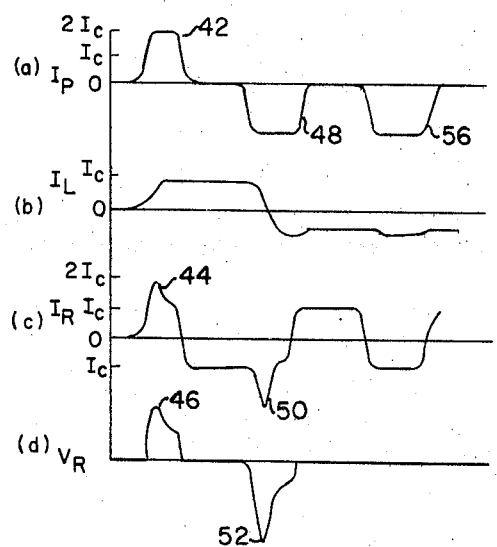
FIG. 11 composed of FIGS. 11a, 11b, 11c, and 11d are graphs of waveforms useful in explaining the operation of the circuit of FIG. 10.

FIG. 11 is a set of graphs illustrating the relationship between various current and voltage waves appearing in the circuit of FIG. 10. Referring to FIG. 11a, an initial current pulse 42 $I_p$ of approximately twice the critical current $I_c$ of the resistance element 26 is supplied by the source of electrical current pulses 28. When the pulse 42 is first applied to the circuit, the current divides between the inductance 24 and the resistance element 26 in the ratio of their inductances. That is, in the transient period immediately after the application of the pulse to the terminals 38 and 40, the amount of current flowing through the inductance 24 or the resistance element 26 is inversely proportional to the inductive reactance of the inductance 24 or the resistance element 26. This means that at first practically all the current passes through the resistance element 26 since the resistance element 26 has a minimum amount of inductive reactance. Thus, in FIG. 11c a momentary surge of current 44 passes through the resistance element 2. Since the surge of current 44 is in excess of the critical current $I_c$ for the resistance element 26, the resistance element 26 ceases being superconducting and presents an electrical resistance to the flow of the current with a voltage drop being developed across the resistance element 26 in a conventional fashion. Accordingly, in FIG. 11d the voltage $V_R$ appearing across the resistance element 26 is shown with a voltage pulse 46 corresponding to the surge of current through the resistance element 26.

The appearance of the voltage across the resistance element 26 causes the amount of current flowing through the inductance 24 to increase and the amount of current flowing through the resistance element to decrease until the current flowing through the resistance element 26 drops to a value equal to the critical current $I_c$ and the resistance element 26 becomes superconductive so that no voltage appears across the resistance element 26. Where the amplitude of the current pulse 42 is approximately two times the critical current value of the resistance element 26, the current divides between the inductance 24 and the resistance element 26 as shown in FIGS. 11b and 11c. When the current pulse 42 drops to zero, the current through the inductance 24 continues due to the action of the inductance 24 in resisting any change in the current flow. However, since the resistance element 26 has substantially no inductance and is superconductive, the current flow through the resistance element 26 reverses and becomes essentially $-I_c$. Since both the inductance 24 and the resistance element 26 are superconducting for values of current flow less than the critical current $I_c$ the current flows from the inductance 24 around the circuit loop through the resistance element 26 and back through the inductance 24 as a persistent current which continues to circulate indefinitely so long as the inductance 24 and the resistance element 26 are superconducting. By applying either a positive or negative current pulse through the switch 36 a circulating persistent current around the circuit loop may be induced in either direction. Thus, the circuit has two distinct modes of operation corresponding to the direction of persistent current flow which may be selected in accordance with information to be stored.

It will be appreciated that the speed of response of the circuit of FIG. 10 to an input signal pulse in establishing a circulating persistent current within the circuit loop is determined to a large extent by the speed with which the resistive element 26 can react to the initiation of pulse current flow as well as the termination of current flow. In other words, the speed of response of the circuit is determined largely by the lag time and recovery time of the resistive element. In accordance with the invention, the recovery time of the resistive element 26 and thus the speed of response of the circuit can be reduced to a minimum by properly limiting the amplitude and duration of the signal pulse.

In order to sense the direction of persistent current flow and to read out the information previously stored in a circuit of the type illustrated in FIG. 10, a current pulse of approximately two times the critical current value $I_c$ of the resistance element 26 may be applied to the circuit from the source of electrical current pulses 28.

In FIG. 11a a negative going interrogating pulse 48 is additive with respect to a persistent circulating current flowing through the resistance element 26. The sum of the currents in the resistance element 26 produces a surge of current 50 in excess of the critical current value of the resistance element 26 which causes the resistance element 26 to become electrically resistive with a voltage pulse 52 appearing across the resistance element 26. The voltage pulse 52 reverses the current flow through the inductance 24 as shown in FIG. 11b, and when the current pulse 48 disappears the inductance 24 causes a current to continue flowing around the circuit loop as a persistent circulating current in a direction opposite to the direction of persistent current before the appearance of the pulse 48. A voltage sensitive output circuit 54 connected across the terminals 38 and 40 senses the appearance of the voltage pulse 52. In contrast, where an interrogating current pulse is applied to the circuit loop which is subtractive with respect to the persistent circulating current flowing through the resistance element 26, such as the negative going pulse 56 shown in FIG. 11a, the current flowing through the resistance element 26 is momentarily decreased as shown in FIG. 11c, with the resistance element 26 remaining superconducting, and no voltage pulse appears at the terminals 38 and 40.

Thus, by applying a current pulse to the circuit loop, the direction of persistent current flow may be ascertained from the appearance of the voltage pulse across the resistance element 26 in the case where the applied pulse is additive with respect to the persistent current flowing in the resistance element 26 and from the lack of an appearance of a voltage pulse across the resistance element 26 when the applied pulse is subtractive with respect to the persistent current flowing through the resistance element 26.

From the above it is apparent that the circuit of FIG. 10 is capable of two distinct modes of operation in which a persistent current flows in a selected direction for an indefinite period to represent information, and the direction of persistent current flow may be sensed to read out and recover the information by applying interrogating signals to the circuit. The rate at which the circuit can be interrogated is determined largely by the speed of recovery of the resistance element 26 from the interrogating signals. Here, again, the interrogating pulses can be limited in amplitude and time duration in accordance with the invention to minimize the recovery time of the resistance element 26.

It is now apparent that the switching speed of superconductive elements can be increased by operating them in accordance with the method of the invention.

What is claimed is:

1. In a method of operating a superconductive computer element by subjecting the element to pulse current of sufficiently long time duration to render the recovery time response of the element dependent upon the amplitude of the pulse and substantially independent of the time duration of the pulse; the element being characterized by a recovery time response that is a function of the amplitude of applied pulse current, with the recovery time attaining a first maximum value corresponding to a first amplitude of pulse current, a second recovery time value substantially less than said first value at a second amplitude of pulse current greater than said first amplitude of current, and a third recovery time value at least as great as said first recovery time value at a third amplitude of current greater than said second amplitude of current; the improvement which comprises: applying an electric current pulse to said element, and limiting the amplitude of pulse current flowing through said element to a range between said first and third current amplitudes.

2. In a method of operating a superconductive computer element by subjecting the element to a current pulse of sufficiently short time duration to render the recovery time response of the element a function of the time duration of the pulse, said element being characterized by a recovery time response that is a function of time duration of applied pulse current flowing through said element, and wherein the response includes, for a pulse current of given amplitude, a first maximum recovery time characteristic corresponding to a first value of applied pulse time duration, a second recovery time characteristic substantially less than said first characteristic at a second pulse time duration greater than said first time duration, and a third recovery time characteristic that is greater than said second recovery time characteristic at a third time duration greater than said second time duration, the improvement which comprises: applying a pulse of current of said given amplitude to said element, and limiting the time duration of the current pulse flowing through said element to a pulse time duration that is longer than said first time duration and shorter than said third time duration.

3. In a method of operating a superconductive computer element by subjecting the element to pulse current of sufficiently long time duration to render the recovery time response of the element dependent upon the amplitude of the pulse and substantially independent of the time duration of the pulse; the element being characterized by a recovery time response that is a function of the amplitude of applied pulse current, with the recovery time attaining a first maximum value corresponding to a first amplitude of pulse current, a second recovery time value substantially less than said first value at a second amplitude of pulse current greater than said first amplitude of current, and a third recovery time value at least as great as said first recovery time value at a third amplitude of current greater than said second amplitude of current; the improvement which comprises: immersing the element in a bath of liquid helium at a temperature above the lambda point of helium and below the critical temperature at which said element is superconductive; applying pulse current to said element; and limiting the amplitude of pulse current flowing through said element to a range between said first and third current amplitudes.

References Cited by the Examiner

Pages 78, 83, February 1958, "Cryogenic Devices in Logical Circuitry and Storage," by J. W. Bremer, Electrical Manufacturing.

Pages 304–308, October 1957, "An Analysis of the Operation of a Persistent-Supercurrent Memory Cell," by R. L. Garwin, I.B.M. Journal.

Pages 295–302, October 1957, "Trapped-Flux Superconducting Memory," by J. W. Crowe, I.B.M. Journal.

October 28, 1957, "A Computer Memory Element Employing Superconducting Persistent Current" by E. C. Crittenden, Jr., Aeronautical Research Lab. of Ramo-Wooldridge Corp. A.R.L. July 1957.

IRVING L. SRAGOW, *Primary Examiner.*

N. N. KUNITZ, T. W. FEARS, *Assistant Examiners.*